Patented Dec. 1, 1936

2,062,547

UNITED STATES PATENT OFFICE 2,062,547

COPPER AND CHROMIUM CONTAINING ACID MONOAZO DYESTUFFS

Karl Wiedemann, Leverkusen-I. G.-Werk, Heinrich Clingestein, Cologne-on-the-Rhine, Hans Krzikalla, Ludwigshafen-on-the-Rhine, and Walther Kuehne, Mannheim, Germany, assignors to General Aniline Works, Inc., New York, N. Y., a corporation of Delaware No Drawing. Application June 8, 1933, Serial No. 674,947. In Germany June 21, 1932

5 Claims. (Cl. 260—12)

The present invention relates to azodyestuffs containing chromium or copper in a complex form. More particularly it relates to azodyestuffs which may be represented by the probable general formula:

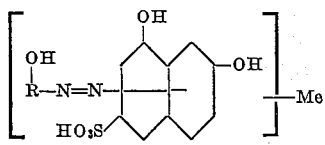

wherein R stands for the radical of a diazotized amine suitable for producing azodyestuffs, Me stands for a chromium or copper atom, and wherein in each component a hydroxy group stands in ortho-position with respect to the azo bridge.

As diazotization components suitable for our invention there may be mentioned by way of example amines of the benzene or naphthalene series containing in ortho-position to the amino group a hydroxy or alkoxy group, such as 1-amino-2-hydroxy- or -alkoxy-benzenes, ortho-amino-hydroxy- or -alkoxy-naphthalenes and their nuclear substitution products, such as nitro, halogen, alkyl and alkoxy nuclear substitution products.

Our new dyestuffs are obtainable by treating a monoazodyestuff of the general formula:

OY
|
R—N=N—(structure with OH, OH, HO₃S)

wherein R means the same as stated above, Y stands for hydrogen or an alkyl group and wherein the group OY and one OH-group stand in ortho-position with respect to the azo bridge, with an agent yielding copper or chromium, according to methods known per se, it being self-understood that in case Y stands for alkyl the conditions of working are to be chosen in such a manner that a splitting off of the alkoxy group in ortho-position to the azo bridge is achieved, for example by working at elevated temperature and superatmospheric pressure.

Our new dyestuffs are in form of their alkali metal salts generally watersoluble dark powders, dyeing animal fibres generally even violet to blue to grey shades of good fastness to light and fulling.

The invention is illustrated by the following examples, without being limited thereto:

*Example 1.*—18.9 parts by weight of 2-aminophenol-4-sulfonic acid are diazotized in the usual manner and coupled with 24 parts by weight of 2,8-dihydroxynaphthalene-6-sulfonic acid in the presence of lime. The dyestuff is isolated in the usual manner, dissolved in 1400 parts by weight of water, the solution is rendered weakly acid by the addition of acetic acid, a solution of chromium fluoride corresponding to 7.7 parts by weight of $Cr_2O_3$ is added, and the reaction mixture is refluxed for 6 hours, then rendered alkaline to soda, filtered and the filtrate evaporated to dryness. The dyestuff thus obtained having in its free state the following formula:

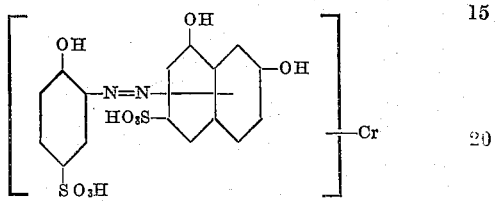

(coupling position not exactly known, probably the 7-position)

dyes wool from an acid bath even reddish-grey shades of good fastness to light and fulling.

*Example 2.*—In an analogous manner as described in Example 1, there is chromed for 8 hours the dyestuff prepared by coupling in an alkaline medium the diazo compound from 14.4 parts by weight of 4-chloro-2-aminophenol with 24 parts by weight of 2,8-dihydroxynaphthalene-6-sulfonic acid. When the chroming is complete, the reaction mass is filtered, and from the filtrate the dyestuff is isolated by salting out. The dyestuff thus obtained having in the free state the probable following formula:

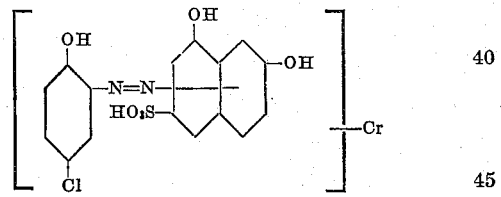

(coupling position not exactly known, probably the 7-position)

dyes wool from an acid bath even bluish-grey shades fast to light and fulling.

*Example 3.*—21.7 parts by weight of 2-amino-4-methyl-1-anisol-5-sulfonic acid are diazotized in the usual manner and coupled in soda-alkaline solution or in the presence of lime with 25 parts by weight of 2,8-dihydroxynaphthalene-6-sulfonic acid. When the coupling is complete, the dyestuff is filtered with suction, dissolved in about 500 parts by weight of water, and heated in an autoclave for about 3 hours at 135° C. with 12 parts by weight of chromium oxide and 20 parts by weight of formic acid. From the reaction mixture the chromium complex compound of the dyestuff formed is precipitated by the addition of mineral acid, filtered with suction and dried. The dyestuff having in the free state the probable following formula:

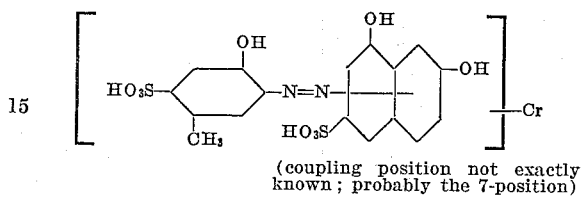

(coupling position not exactly known; probably the 7-position)

dyes wool and silk very even bluish-grey shades of good fastness to light, fulling and water.

When using in the starting monoazodyestuff as diazotization component ortho-anisidine, or 4-methyl-2-amino-1-anisol, or 2-amino-1-anisol-4-sulfonic acid, or 4-chloro-2-amino-1-anisol, there are obtained chromium containing azodyestuffs dyeing wool more greenish-grey shades.

*Example 4.*—23.4 parts by weight of 6-nitro-2-aminophenol-4-sulfonic acid are diazotized in the usual manner and coupled in a soda-alkaline medium with 24 parts by weight of 2,8-dihydroxynaphthalene-6-sulfonic acid. When the coupling is complete, the dyestuff formed is isolated by salting out with common salt; the isolated dyestuff is dissolved in about 1200 parts by weight of water, the solution is rendered weakly acid to litmus by the addition of hydrochloric acid, an aqueous solution prepared from 25 parts by weight of crystallized copper sulfate is added, and the whole is refluxed for about 2 hours. Then the solution is rendered soda-alkaline, filtered, and from the filtrate the copper complex compound of the dyestuff is salted out with common salt. The dyestuff thus obtained having in its free state the probable following formula:

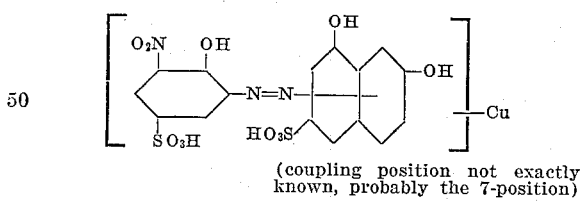

(coupling position not exactly known, probably the 7-position)

dyes leather well-egalizing violet shades of excellent fastness to light. Wool is dyed bluish-violet shades of good fastness to light.

We claim:

1. Monoazodyestuffs of the general formula:

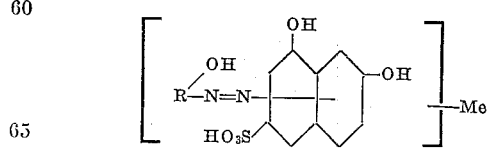

wherein R stands for the radical of a diazotized amine suitable for producing azodyestuffs, Me stands for a heavy metal of the group consisting of chromium and copper, and wherein in each component a hydroxy group stands in ortho-position with respect to the azo bridge, being in form of their alkali metal salts generally watersoluble dark powders, dyeing animal fibres generally even violet to blue to grey shades of good fastness to light and fulling.

2. Monoazodyestuffs of the general formula:

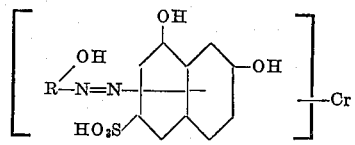

wherein R stands for the radical of a diazotized amine suitable for producing azodyestuffs, and wherein in each component a hydroxy group stands in ortho-position with respect to the azo bridge, being in form of their alkali metal salts generally watersoluble dark powders, dyeing animal fibres generally even violet to blue to grey shades of good fastness to light and fulling.

3. Monoazodyestuffs of the general formula:

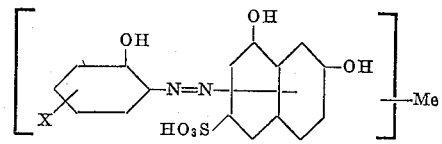

wherein X represents a member selected from the group consisting of hydrogen, halogen, alkyl, alkoxy, nitro- and the sulfonic acid group, Me stands for a heavy metal of the group consisting of chromium and copper, and wherein the azo bridge is attached to the naphthalene nucleus in ortho-position to one of the hydroxy groups, being in form of their alkali metal salts generally watersoluble dark powders, dyeing animal fibres generally even violet to blue to grey shades of good fastness to light and fulling.

4. Monoazodyestuffs of the general formula:

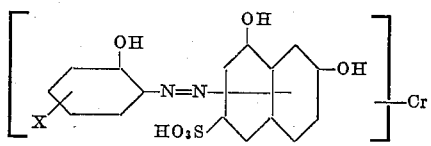

wherein X represents a member selected from the group consisting of hydrogen, halogen, alkyl, alkoxy, nitro- and the sulfonic acid group, and wherein the azo bridge is attached to the naphthalene nucleus in ortho-position to one of the hydroxy groups, being in form of their alkali metal salts generally watersoluble dark powders, dyeing animal fibres generally even violet to blue to grey shades of good fastness to light and fulling.

5. The monoazodyestuff of the formula:

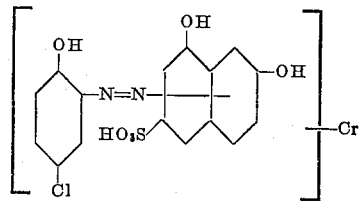

wherein the azo bridge is attached to the naphthalene nucleus in ortho-position to one of the hydroxy groups, being in form of its alkali metal salts a dark powder, soluble in water, dyeing wool from an acid bath even bluish-grey shades, fast to light and fulling.

KARL WIEDEMANN.
HEINRICH CLINGESTEIN.
HANS KRZIKALLA.
WALTHER KUEHNE.